Figure 3:
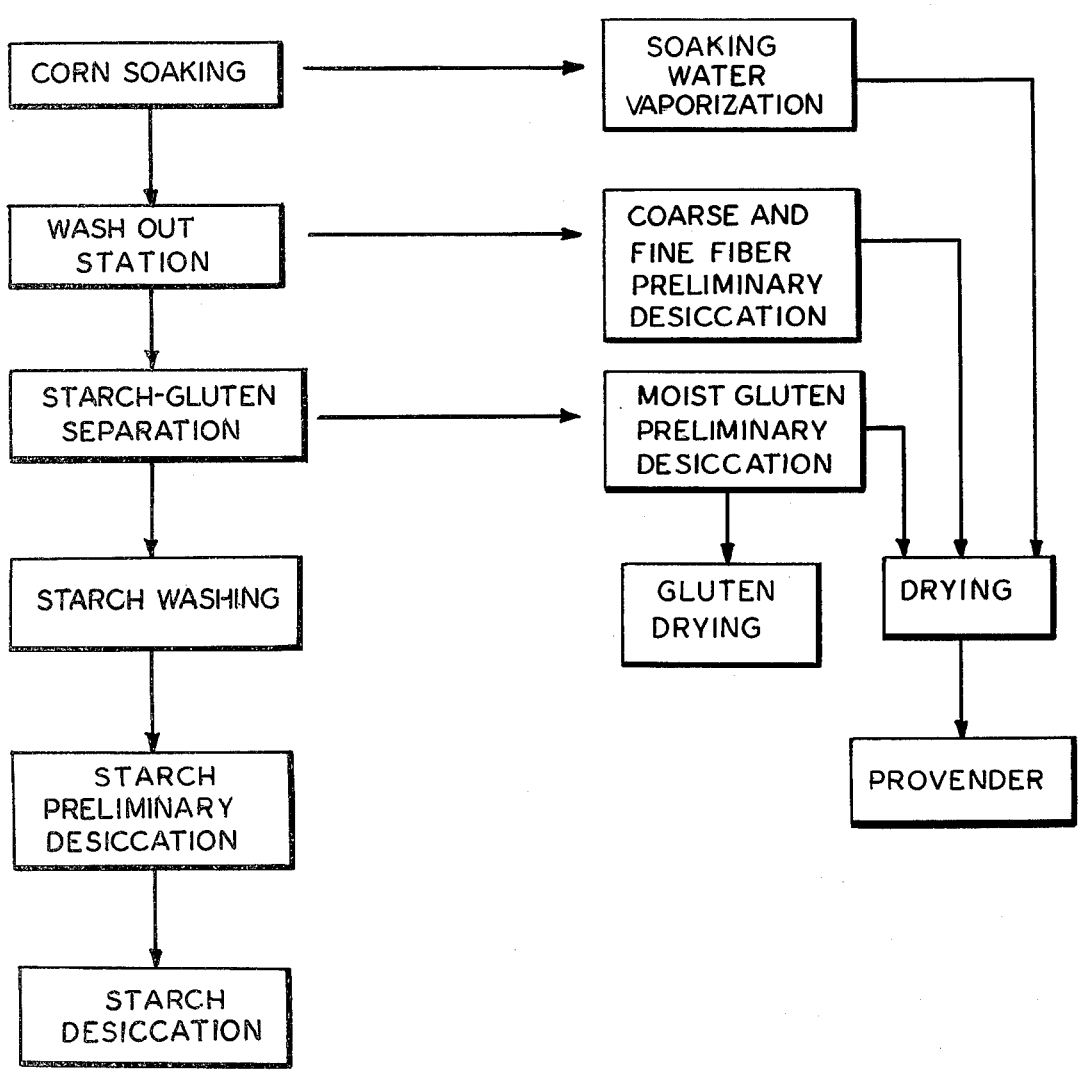

United States Patent [19]

Schwengers

[11] 3,939,281

[45] Feb. 17, 1976

[54] EXTRACTION OF FAT FROM STARCH-CONTAINING VEGETABLE MATTER

[75] Inventor: Dieter Schwengers, Dormagen, Germany

[73] Assignee: Pfeifer & Langen, Cologne, Germany

[22] Filed: Nov. 9, 1973

[21] Appl. No.: 414,495

[30] Foreign Application Priority Data

Nov. 14, 1972 Germany............................ 2255666
Nov. 14, 1972 Germany............................ 2255667

[52] U.S. Cl.................. 426/11; 195/31 R; 426/16; 426/417; 426/425; 426/429; 426/430
[51] Int. Cl.$^2$.. C11B 1/04; C11B 1/10; C12C 11/00
[58] Field of Search .......... 426/429, 430, 425, 436, 426/16, 11, 417; 195/31 R

[56] References Cited
UNITED STATES PATENTS

| | | | |
|---|---|---|---|
| 2,107,529 | 2/1938 | Fetzer | 426/436 X |
| 2,286,334 | 6/1942 | Brandt | 426/430 |
| 3,155,523 | 11/1964 | Reich | 426/430 |
| 3,337,414 | 8/1967 | Wilson | 195/31 R |
| 3,519,431 | 7/1970 | Wayne | 426/430 X |
| 3,795,750 | 3/1974 | Levine | 426/429 X |

Primary Examiner—David M. Naff
Attorney, Agent, or Firm—Burgess, Dinklage & Sprung

[57] ABSTRACT

Fat is removed from starch-containing vegetable material such as cereal grains, potatoes or tapioca by a process involving crushing the vegetable material, contacting the crushed material with a normally gaseous inert solvent under supercritical condition at a temperature of about 20° to 100°C and a pressure of about 30 to 1000 atmospheres to dissolve fat from the vegetable material into the solvent, separating the fat-containing solvent from the resultant substantially fat-free vegetable residue, and separating the dissolved fat from the solvent by raising the temperature and/or lowering the pressure to separate vaporized solvent from the fat. The vaporized solvent may be liquefied and recycled. The fat-free residue may be treated to dissolve away gluten, to form glucose by enzymatic hydrolysis and/or subjected to alcoholic fermentation.

9 Claims, 3 Drawing Figures

EXTRACTION OF FAT FROM STARCH-CONTAINING VEGETABLE MATTER

The invention relates to a method for degreasing crushed highly starchy fatty vegetable material such as occurs above ground, for example, cereals and grains such as corn, wheat, barley, rye and oats, or below ground such as bulbs, e.g. potatoes or tapioca.

The degreasing of cereals, in particular corn, is usually confined to the removal of the germ which in the case of corn contains up to 84% of the total fat content. The conventional methods are dry degermination and wet degermination. In case of wet degermination, the cereals are first soaked up to 50 hours. Subsequently, as in the case of dry degermination, the cereals are carefully coarsely ground in order to uncover the germ. The germ is then removed by methods such as flotation or air sifting, which make use of the differences in specific gravities of the lighter and the heavier grain rupture pieces, and are subsequently washed out, dehydrated and de-oiled by screw extrusion or by extraction with organic grease solvents, such as hexane. The remaining oil cake, which mainly consists of proteins, serves as provender.

Both methods are disadvantageous in that they do not lead to a complete degreasing because they only remove the fat of the germ. The germ may be damaged by the grinding operation and their fat is then absorbed by the other grain components. For the mentioned reasons, the total fat content (glycerides plus free fatty acids) of native cereal starch usually amounts to from 0.8 – 1% and that of flour and semolina from 1 to 4%.

An object of the invention is to provide a method for degreasing crushed, highly starchy, fatty vegetable material which can be carried out by technically simple procedures and which permits a gentle and complete removal of the fats and fatty acids from highly starchy vegetable material.

This and other objects and advantages are realized in accordance with the present invention which involves degreasing vegetable matter containing starch and fats by crushing said vegetable matter, contacting the crushing matter with a normally gaseous inert solvent under supercritical condition thereby to dissolve the fats from said vegetable matter, separating the fat-containing solvent from the substantially fat-free vegetable residue, and separating the dissolved fat from the solvent by at least one of raising the temperature and lowering the pressure thereby to precipitate the dissolved fat.

The extraction is conducted at a temperature range of about 20° to 100°C at about 30 to 100 atmospheres, preferably about 40 to 150 atmospheres. Particularly inert gases having a critical temperature of below about 200°C are suitable. Examples of such gases are alkanes and especially lower alkanes such as ethane, propane and butane, alkenes and especially lower alkenes such as ethylene, propylene and butylene, dialkyl ethers such as dimethyl ether, $SO_2$, $CO_2$, halogenated lower hydrocarbons such as $CHF_3$, $CClF_3$, $CFCl_3$, $CF_2=CH_2$, $CF_3-CF_2-CF_3$, $CF_4$ $CH_3-CF_3$, $CHCl_2F$, $CCl_2F_2$, $N_2O$, noble gases such as particularly argon, $NH_3$ and $N_2$.

Figure 1:
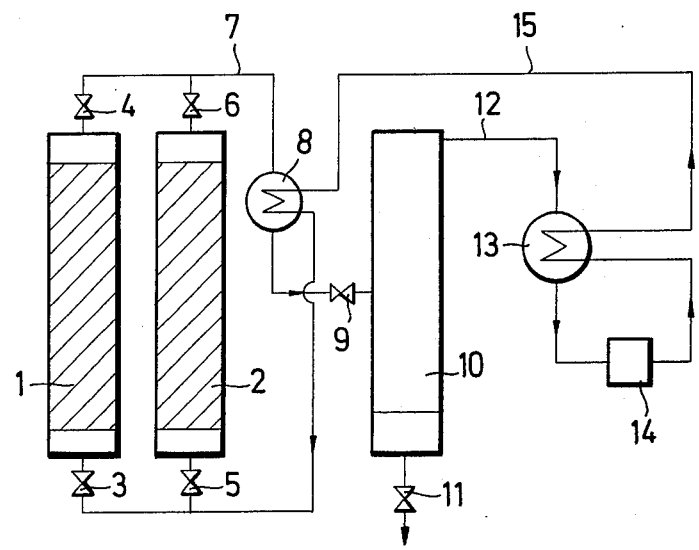
Figure 2:
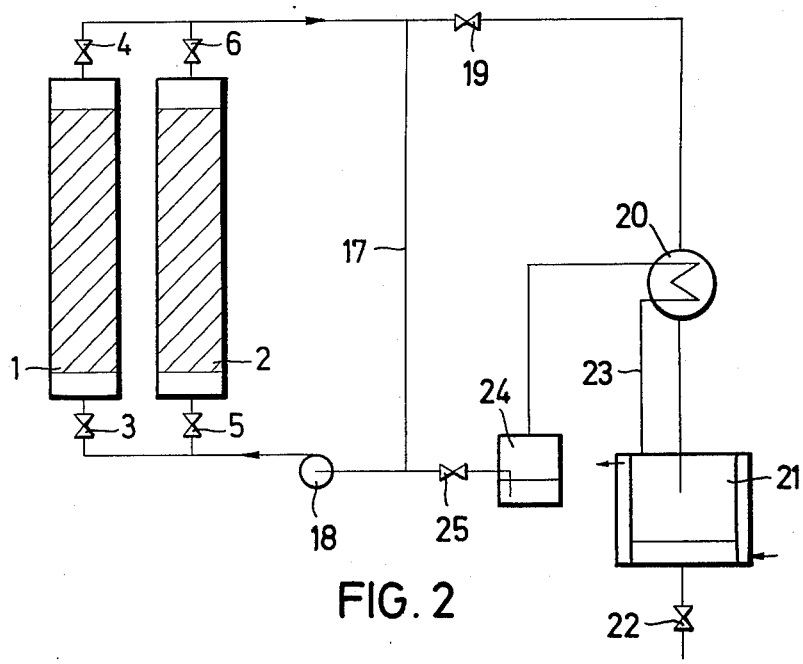

The invention will be further described with reference to the accompanying drawings: wherein FIG. 1 is a flow sheet of an apparatus for carrying out one embodiment of the novel process;

FIG. 2 is a flow sheet of another apparatus for carrying out a second embodiment of the process; and FIG. 3 is a flow sheet of one process for further processing material degreased in accordance with FIGS. 1 or 2.

In accordance with one aspect of the invention, it was found that gases in supercritical condition, e.g. ethane, ethylene and propane, at a given temperature absorb many times more fats and fatty acids than would be expected from the partial pressure of the fats and fatty acids at the given temperature. The loading capacity of the gaseous solvents in supercritical condition with respect to fats and fatty acids increases with augmenting pressure and decreases with rising temperature. Thus, when carrying out the extraction with supercritical gases, a pressure which is substantially higher than the critical pressure of the solvent and a temperature only slightly above the critical temperature are selected.

By means of pressure release, the fat dissolved by the gases is separated in a blow-off tank. The temperature is maintained above the critical temperature of the gas in order to prevent condensation. The gas freed to a large extent from the dissolved fatty substances is subsequently re-compressed to the supercritical working pressure and heated to working temperature.

An appropriate apparatus for carrying out this process is schematically illustrated in FIG. 1. The ground highly starchy vegetable material is in the two chambers 1 and 2 which can be alternately operated by opening the valves 3 and 4 or 5 and 6. While the material is extracted in one chamber, the second chamber may be discharged and recharged. The low-boiling solvent present in supercritical condition passes through the chambers 1 and 2, advantageously in an upward direction, and is fed over the conduit 7 through heat exchanger 8 and depressurized by means of the pressure-reducing valve 9 into column 10. The extracted fats and other components are precipitated as liquids and can be recovered through valve 11. The low-boiling solvent escapes in the gaseous state and is fed through conduit 12 over a heat exchanger 13 to compressor 14, is repressurized to the working pressure of extraction in chambers 1 and 2 and is again fed back through conduit 15 and heat exchangers 8 and 13 to the extraction chambers.

Separation of the fats by selective liquefaction may also be accomplished by temperature increase at constant pressure while maintaining supercritical conditions.

It is more advantageous to conduct the extraction with one of the specified gases in the liquid phase and at a pressure of about 30 atmospheres above the critical pressure and at a subcritical temperature of the gas. The so-formed solution of vegetable oil and other components in liquid gas is fed into a vaporizing container and is there raised to a temperature of about 50°C above the critical temperature of the solvent and thereby fractionally distilled. The escaping supercritical solvent is condensed in a heat exchanger and is pumped back into the extraction container. This method of fat separation is particularly advantageous from an energy point of view since by going over to the supercritical condition, not the high heat of vaporization of the solvent, but only the relatively low specific heat must be supplied.

This method of extraction is schematically illustrated in FIG. 2 wherein the reference numbers 1 to 6 have the same meaning as in FIG. 1. The liquid solvent, e.g. propane, which is circulated through the conduit 17 and the pump 18, is alternately passed through one of the extraction chambers. The solvent which is enriched with fats and other components is piped off from this cycle by opening valve 19 and is rendered supercritical in heat exchanger 20 and the heated separator 21 by heating. Thereby, the extracted material may be separated and discharged through valve 22. Thereafter, the solvent in supercritical condition again reaches the heat exchanger through conduit 23 wherein it is cooled down and liquefied. The liquid solvent is then sucked back by pump 18 from the storage compartment 24 into the main cycle by opening valve 25.

The basic advantages of this subcritical-supercritical mode of operation are a substantially lower working pressure and less expenditure of time since in each extraction step more vegetable oil and vegetable components e.g. lecithin and carotene, are dissolved by the liquid solvent than by the same quantity of solvent in supercritical condition. All solvents which have been studied in supercritical condition dissolve less fats or fatty acids than in liquid condition.

The degreasing may even be carried out with material from which the husks have not yet been removed. Harvest-fresh cereals and even partly washed cereals may be advantageously used. Consequently, the costs of drying can be cut down. On the other hand, the method of the invention may also be coupled with a drying operation by using suitable gaseous extracting agents such as carbon dioxide so that a degreased, dried, comminuted, highly starchy vegetable material is obtained which is unaffected by storing. In this case, it is expedient that fats, fatty acids, and other valuable components are first separated from the extracting agent and the water-containing extracting agent is subsequently dried which, for example, may be performed by freezing whereupon the dried agent is fed again to the extraction. While the utilization of pre-dried cereal is possible, however, it involves no particular advantages because the degreasing is more effective and complete if the crushed vegetable material to be processed has a certain water content which may even reach the maximum water absorptive capacity amounting, e.g. to about 40% of the dry material in the case of corn semolina.

The material rich in starch, such as cereal, is prefiltered by conventional method, particularly by screening, and is subsequently ground. It is by all means sufficient for the further process steps if the cereal is only crushed to a grain size of below about 0.5mm. This semolina-like product is extracted for recovering the fats, free fatty acids, and other valuable components present therein in the manner according to the invention with low-boiling solvents at high pressures and low temperatures. If the starting product is corn, a crude corn germ oil is obtained.

One embodiment of a process for further treating the degreased material to starch following the extraction operation is illustrated in FIG. 3, the degreasing of corn being chosen as an example. The degreased corn is soaked for several hours in about 1.5 to 3 times its weight of sulfur dioxide-containing water having an $SO_2$ content of about 0.1 to 0.2% at a moderately elevated temperature of about 30 to 40°C. While the soaking operation under otherwise equal conditions takes usually up to 50 hours, it can be reduced to about 12 hours because of the pretreatment according to the invention. At the same time, it is possible to reduce the sulfur dioxide content of the soaking medium to about 0.1 – 0.2% by weight. After removal of the soaking water, the soaked product is washed out with pure water. Coarse and fine fibers are obtained thereby which, subsequent to the preliminary desiccation and drying, yield a provender which is unaffected by storing by virtue of the preceding degreasing operation. The separated, desiccated and dried gluten may be admixed thereto or used independently as highgrade provender rich in albumen. If it has a sufficiently high solids content, the soaking water may be vaporized to yield a further provender component. Finally, for obtaining the starch, washing, desiccation and drying are performed. The end product is a pure nutrient starch which is unaffected by storing.

In another embodiment, the degreased highly starchy vegetable material is finely ground, suspended with water and the starch is separated as an aqueous suspension by centrifuging. In this connection, it is necessary to utilize at least about twice as much water by weight as starch, the amount of water being kept as low as possible for reasons of economy. Hence, the process of starch extraction can be carried out without long-time soaking but is substantially more rapid and simple.

Alternatively, the degreased material may be also advantageously further processed to starch conversion products, in particular glucose. Starch conversion products are conventionally prepared by hydrolysis of starch with mineral acids and/or amylases. For several years, the direct saccharification of dry degerminated cereals, in particular corn, is utilized (Kreyer-Verfahren, K. Kreyer, Starke 18, 1966, page 311).

In the case of prior art direct saccharification, the purified corn is first subjected to a pre-grinding operation. The separation of the germ follows thereafter by conventional methods. After the subsequent fine grinding, a corn semolina is obtained which is suitable for liquefying the starch. The thus dry degerminated corn is treated with $\alpha$-amylases in order to liquefy the starch. Thereafter, it is saccharified to the desired degree of saccharification by means of amyloglucosidases (DE, dextrose equivalent). The gluten components and husks are eliminated by filtration and the salt-like components by subsequent demineralization. The desired end product can be obtained from the resulting solution by vaporization.

However, this prior art process has aggravating disadvantages. There exist, for example, substantial problems of filtration due to the fat content of the dry degerminated corn. In the dry degermination, the fats as well as the fatty acids are eliminated only up to 85%.

The filtration during preparation is rendered difficult due to the residual content of fats because the fats and fatty acids, being insoluble in water, are of glutinous nature and cause rapid clogging of the filter and thus reduce the flow through the filter and necessitate more frequent renewal of the filter than if grease-free starchy material is converted.

In addition, the $\alpha$-amylases liquefy the starch present in the corn semolina more slowly than pure starch which leads to viscosity problems. The slower liquefaction is a consequence of dispensing with soaking of the corn in $SO_2$-containing water in the case of direct saccharification, a measure which precedes the wet grinding in order to disintegrate the protein matrix and destroy the amylase inhibitors present in the cereal.

For obtaining glucose, the starch can be first extracted and then liquefied and subsequently saccharified.

However, the degreased material may be directly saccharified, basic simplifications of the known Krøyer method being possible. The saccharification may be conducted with the material which still contains the husks, particularly with corn semolina. The process steps of this direct saccharification comprise liquefaction, filtration to remove the gluten and husks, the actual saccharification with amyloglucosidases, and the demineralization. The final product may be — as desired — either glucose syrups or pure glucose.

The particular advantages of the method according to the invention reside in that as compared to the prior art methods several complicated process steps can be dispensed with. The pregrinding is omitted as well as the separation of the germ, the fine grinding as well as the removal of the husks. In place thereof, merely a grinding which may be easily carried out is to be employed. The product thus obtained can be subjected to liquefaction immediately after the degreasing operation. The almost complete degreasing of the starting materials by extraction of the fats and fatty acids with inert gases according to the invention is particularly remarkable. The filtration problems constantly occurring in the case of the known process are not encountered in accordance with the present invention. Furthermore, it was found that the liquefaction of the starch can be performed in a substantially shorter time. This is probably to be ascribed to the fact that due to the pressure treatment during extraction, the amylase inhibitors are deactivated. A superior effectivity of the $\alpha$-amylases can be further realized if carbon dioxide is admixed with the inert gases during the extraction and the ground highly starchy vegetable material is treated with gaseous carbon dioxide subsequent to extraction. For this purpose, gases are selected which do not react with carbon dioxide. The effectivity of the $\alpha$-amylase increases with increases in the water content of the highly starchy vegetable material during the treatment with $CO_2$.

A similar increase in effectivity is observed on addition of sulfur dioxide to solvents which do not react therewith. Quantities of up to about 5% by weight $SO_2$ and about 20% by weight $CO_2$ relative to the solvent usually have the desired effect. Preferred minimum levels are about 1% for $SO_2$ and about 1%, preferably about 5% and especially about 10% for $CO_2$.

Finally, the extracted and hence degreased highly starchy vegetable material may also be directly subjected to an alcoholic fermentation. It can be utilized in brewing especially as raw fruit (malt additive). This may be performed either by admixing it with malt and yeast in one step, or in two steps in that a starch and nitrogen-containing sugar is first prepared from starch and albumen decomposing enzymes and is then added to the wort during fermentation.

By using the kinds of cereals degreased according to the invention, in particular corn semolina, for brewing, the difficulties which occur in utilizing fat-containing raw materials for the production of beer are avoided. In particular the fining of the beer is facilitated.

The invention is further described in the following illustrative examples wherein all parts are by weight unless otherwise specified.

EXAMPLE 1

1 kg corn is pre-purified (water content 13.8%), ground (grain size less than 0.2 mm) and a stream of liquid propane at 80°C and about 50 atomspheres is circulated through the corn in one of the extraction chambers 1 and 2 of FIG. 2. The propane which is loaded with fats and other components is by-passed through valve 19 and is rendered supercritical by means of heat exchanger 20 and separator 21 by heating to 150°C whereby the extracted substances are separated. The propane which is freed from the extracted oil is cooled down to 80°C in heat exchanger 20 and fed back in the liquid phase into the main cycle.

1 kg of the so-pretreated corn semolina is soaked for 12 hours at 50°C in 3 kg of sulfur dioxide-containing water (0.2% $SO_2$). The soaked product is washed out with pure water after drawing off the soaking water. The husks are removed by screening. Subsequent to the starch-gluten-separation (Pelshenke und Lindemann; "Die Starke", 1954, pages 177–182), washing, preliminary desiccation, and drying, nutrient starch having a fat content of 0.01 is obtained.

EXAMPLE 2

The procedure is carried out as in Example 1 except for using a propane-sulfur dioxide mixture (5% $SO_2$) as extracting agent. The soaking time may be reduced to 6 hours. Purity and yield of nutrients remain equally satisfactory.

EXAMPLE 3

Liquid propane at 80°C and about 50 atmospheres is circulated through 1 kg ground corn (water content 13.8%, grain size distribution: 1% screening residue 600 $\mu$, 70% screening residue 400 $\mu$, 29% screening residue 200 $\mu$) in one of the extraction chambers 1 and 2 (see FIG. 2). The propane which is loaded with fats and other components is by-passed through valve 10 and is rendered critical by means of heat exchanger 20 and separator 21 by heating to 150°C whereby the extracted substances are separated. The propane which is freed from the extracted oil is cooled down to 80°C in the heat exchanger and is fed back into the main cycle in the liquid phase. The degreased corn semolina has a fat content of only 0.01% in the dry state.

1 kg of the so-degreased corn semolina having a water content of 12% is stirred with 1.8 kg of water for 30 minutes. The suspension was adjusted to a pH-value of 6 and liquefied with $\alpha$-amylase for 1 hour at 85°C. Thereafter, it was heated to 120°C for 10 minutes, cooled down to 60°C, adjusted to a pH-value of 4.5 and saccharified with amyloglucosidase for 48 hours. Brief heating to 110°C, centrifuging, decolorization with activated charcoal and demineralization with ion-exchangers followed. 710 g of pure glucose were obtained.

It will be appreciated that the instant specification and examples are set forth by way of illustration and not limitation, and that various modifications and changes may be made without departing from the spirit and scope of the present invention.

What is claimed is:

1. The process for degreasing vegetable matter containing starch and fats which comprises crushing said vegetable matter, extracting the crushed matter with a normally gaseous inert solvent in liquid state at a temperature of about 20° to 100°C and below the critical temperature and a pressure of about 30 to 1000 atmospheres and above the critical pressure of the inert solvent which solvent has a critical temperature below about 200°C, separating the fat-containing solvent from the substantially fat-free vegetable residue, separating the dissolved fat from the solvent by raising the temperature to vaporize the solvent, and reducing the pressure of the fat-free vegetable residue.

2. The process of claim 1, wherein the pressure during extraction is about 40 to 150 atmospheres.

3. The process of claim 1, wherein the vegetable matter comprises freshly harvested cereal.

4. The process of claim 1, wherein the solvent comprises at least one member selected from the group consisting of alkenes, dialkyl ethers, halogenated alkanes, argon, $NH_3$, $N_2$, $SO_2$ and $CO_2$.

5. The process of claim 4, where the solvent comprises at least two of said members of which one is $SO_2$ or $CO_2$.

6. The process of claim 1, including the further steps of grinding the fat-free vegetable residue, mixing the ground residue with at least about twice its weight of water, and separating an aqueous suspension of starch from unsuspended residue.

7. The process of claim 1, including the further steps of soaking the fat-free vegetable residue with about 1.5 to 3 times its weight of water having about 0.1 to 0.2% by weight of $SO_2$ dissolved therein to dissolve away gluten from the residue, and separating husks and fiber from said residue to leave the raw starch.

8. The process of claim 1, including the further steps of suspending the fat-free vegetable residue in at least about twice its weight of water, adding starch-decomposing enzymes to said suspension thereby to decompose the starch to glucose, and removing the aqueous solution of glucose.

9. The process of claim 1, including the further step of subjecting the fat-free vegetable residue to an alcoholic fermentation.

* * * * *